US011881170B2

(12) United States Patent
Park et al.

(10) Patent No.: US 11,881,170 B2
(45) Date of Patent: Jan. 23, 2024

(54) LIGHT EMITTING DISPLAY DEVICE AND DRIVING METHOD THEREOF

(71) Applicant: LG Display Co., Ltd., Seoul (KR)

(72) Inventors: Jong Sin Park, Paju-si (KR); Sung Wook Choi, Paju-si (KR); Jin Woo Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/978,728

(22) Filed: Nov. 1, 2022

(65) Prior Publication Data

US 2023/0215358 A1 Jul. 6, 2023

(30) Foreign Application Priority Data

Dec. 30, 2021 (KR) ........................ 10-2021-0193350

(51) Int. Cl.
*G09G 3/3233* (2016.01)

(52) U.S. Cl.
CPC ... *G09G 3/3233* (2013.01); *G09G 2300/0842* (2013.01); *G09G 2310/0251* (2013.01); *G09G 2310/08* (2013.01); *G09G 2320/0247* (2013.01)

(58) Field of Classification Search
CPC ......... G09G 3/3233; G09G 2300/0866; G09G 2310/0256
See application file for complete search history.

(56) References Cited

U.S. PATENT DOCUMENTS

| | | | | |
|---|---|---|---|---|
| 6,380,689 B1 | 4/2002 | Okuda | | |
| 6,583,775 B1 | 6/2003 | Sekiya et al. | | |
| 2006/0214888 A1* | 9/2006 | Schneider | G09G 3/3233 | 345/76 |
| 2009/0079679 A1* | 3/2009 | Nam | G09G 3/3233 | 345/82 |

(Continued)

FOREIGN PATENT DOCUMENTS

| | | | |
|---|---|---|---|
| JP | H10-312173 A | 11/1998 | |
| JP | 2001-060076 A | 3/2001 | |

(Continued)

OTHER PUBLICATIONS

European Patent Office, Extended European Search Report, European Patent Application No. 22205400.9, dated May 11, 2023, 11 pages.

(Continued)

*Primary Examiner* — Kevin M Nguyen
(74) *Attorney, Agent, or Firm* — Fenwick & West LLP

(57) ABSTRACT

A light emitting display device is disclosed that includes an organic light emitting diode having an anode electrode connected to a first power line and a cathode electrode, a capacitor configured to store a data voltage and having a first electrode and a second electrode, and a driving transistor having a first electrode connected to the cathode electrode of the organic light emitting diode, a gate electrode connected to the first electrode of the capacitor, and a second electrode connected to the second electrode of the capacitor and a second power line. The driving transistor applies an initialization voltage to a node connected to the cathode electrode of the organic light emitting diode and the first electrode of the driving transistor.

15 Claims, 12 Drawing Sheets

(56) References Cited

U.S. PATENT DOCUMENTS

| | | | | |
|---|---|---|---|---|
| 2010/0171738 | A1* | 7/2010 | Yamashita | G09G 3/3258 345/213 |
| 2014/0118328 | A1* | 5/2014 | Guo | G09G 3/3233 345/212 |
| 2018/0218680 | A1 | 8/2018 | Cai | |
| 2021/0210016 | A1 | 7/2021 | Li et al. | |
| 2021/0366385 | A1 | 11/2021 | Wang | |

FOREIGN PATENT DOCUMENTS

| | | | |
|---|---|---|---|
| JP | 2001-109432 | A | 4/2001 |
| JP | 2008-122836 | A | 5/2008 |

OTHER PUBLICATIONS

The Japan Patent Office, Office Action, Japanese Patent Application No. 2022-175945, dated Oct. 17, 2023, seven pages.

* cited by examiner

LIGHT EMITTING DISPLAY DEVICE AND DRIVING METHOD THEREOF

CROSS-REFERENCE TO RELATED APPLICATION

This application claims the benefit of Republic of Korea Patent Application No. 10-2021-0193350 filed on Dec. 30, 2021, which is hereby incorporated by reference in its entirety.

BACKGROUND

Field of Technology

The present disclosure relates to a light emitting display device and a driving method thereof.

Discussion of the Related Art

In accordance with development of information technology, the market for display devices as a medium interconnecting users and information is expanding. As such, use of display devices such as a light emitting display (LED) device, a quantum dot display (QDD) device, a liquid crystal display (LCD) device and the like is increasing. Organic light emitting diode (OLED) devices are also becoming increasingly popular. In OLED devices, an electroluminescent layer comprising an organic compound emits visible light. Accordingly, no backlight is required. A high picture quality can be achieved while reducing device thickness and weight.

The above-mentioned display devices include a display panel including subpixels, a driver configured to output a drive signal for driving the display panel, and a power supply configured to generate electric power to be supplied to the display panel or the driver.

When drive signals, for example scan signals and data signals, are supplied to subpixels formed at a display panel in a display device as mentioned above, selected ones of the subpixels transmit light or directly emit light and, as such, the display device may display an image. It has been observed, however, that subpixels from such display devices can suffer from problematic damage and/or flickering over time.

SUMMARY

Accordingly, the present disclosure is directed to a light emitting display device and a driving method thereof that substantially obviate one or more problems due to limitations and disadvantages of the related art.

An object of the present disclosure is to provide a light emitting display device and a driving method thereof which are capable of eliminating a problem in which an organic light emitting diode (OLED) flickers or is damaged due to a high voltage difference during initial driving thereof. An invention is defined in the appended claims.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a light emitting display device includes an organic light emitting diode having an anode connected to a first power line, a capacitor configured to store a data voltage, and a driving transistor having a first electrode connected to the cathode electrode of the organic light emitting diode, a gate electrode connected to the first electrode of the capacitor, and a second electrode connected to a second electrode of the capacitor and a second power line. The driving transistor applies an initialization voltage to a node connected to the cathode of the organic light emitting diode and the first electrode of the driving transistor.

The initialization voltage may be selected to prevent the organic light emitting diode from emitting light.

The initialization voltage may be greater than a voltage obtained by subtracting a threshold voltage of the organic light emitting diode from a voltage level applied to the first power line. The threshold voltage of the organic light emitting diode may be a voltage difference across an anode and a cathode of the OLED above which the OLED emits light (and equivalently a voltage difference below which the OLED does not emit light). Herein, the voltage level applied to the first power line may be referred to as a first voltage or a high voltage.

The initialization voltage may be less than a voltage obtained by adding the voltage level applied to the first power line and a magnitude of a breakdown voltage of the organic light emitting diode. The breakdown voltage may be a negative bias voltage across an anode and a cathode of the OLED above which the OLED would be irreversibly damaged.

In another aspect of the present disclosure, there is provided a light emitting display device including a display panel including a subpixel including an organic light emitting diode having an anode connected to a first power line, a capacitor configured to store a data voltage, and a driving transistor having a first electrode connected to the cathode electrode of the organic light emitting diode, a gate electrode connected to the first electrode of the capacitor, and a second electrode connected to a second electrode of the capacitor and a second power line; and a driver configured to drive the display panel, wherein the display panel has an initialization period in which an initialization voltage is applied to a node connected to the cathode of the organic light emitting diode and the first electrode of the driving transistor.

The initialization period may be performed at least one time during initial driving of the display panel.

The initialization voltage may be greater than a voltage obtained by subtracting a threshold voltage of the organic light emitting diode from a voltage level applied to the first power line. The initialization voltage may also be less than a voltage obtained by adding the voltage level applied to the first power line and a magnitude of a breakdown voltage of the organic light emitting diode.

The initialization voltage may be transmitted through the second power line and may be applied to the node, at which the cathode of the organic light emitting diode and the first electrode of the driving transistor are interconnected, via the second electrode of the driving transistor.

In another aspect of the present disclosure, there is provided a driving method of a light emitting display device including a display panel including a subpixel including an organic light emitting diode having an anode connected to a first power line, a capacitor configured to store a data voltage, and a driving transistor having a first electrode connected to the cathode electrode of the organic light emitting diode, a gate electrode connected to the first electrode of the capacitor, and a second electrode connected to a second electrode of the capacitor and a second power line, and a driver configured to drive the display panel, the driving method including applying an initialization voltage to the second power line, and turning on the driving transistor such that the initialization voltage is applied to a node, at which the cathode of the organic light emitting diode and the first electrode of the driving transistor are interconnected, via the second electrode of the driving transistor.

The initialization voltage may be greater than a voltage obtained by subtracting a threshold voltage of the organic light emitting diode from a voltage level applied to the first power line. The initialization voltage may also be less than a voltage obtained by adding the voltage level applied to the first power line and a magnitude of a breakdown voltage of the organic light emitting diode.

In accordance with the examples of the present disclosure, there is an effect in that it may be possible to eliminate a problem in which an organic light emitting diode flickers or is damaged due to a high voltage difference during initial driving, through application of a voltage having a voltage level capable of initializing a drain node of a subpixel while preventing the organic light emitting diode from emitting light.

BRIEF DESCRIPTION OF THE DRAWINGS

The accompanying drawings, which are included to provide a further understanding of the disclosure and are incorporated in and constitute a part of this application, illustrate example(s) of the disclosure and along with the description serve to explain the principle of the disclosure. In the drawings.

DETAILED DESCRIPTION

A display device according to an example of the present disclosure may be implemented as a television, an image player, a personal computer (PC), a home theater, an automobile electric device, a smartphone, etc., without being limited thereto.

Although a subpixel, which will be described hereinafter, will be described in conjunction with an example in which the subpixel includes an n-type thin film transistor, the subpixel may be implemented to include a p-type thin film transistor or a thin film transistor having a type in which both the n type and the p type are present. The thin film transistor may be a triple-electrode element including a gate, a source and a drain. The source is an electrode configured to supply a carrier to the transistor. The carrier in the thin film transistor first flows from the source. The drain is an electrode from which the carrier is discharged from the thin film transistor to an exterior of the thin film transistor. That is, the carrier in the thin film transistor flows from the source to the drain.

In the ease of a p-type thin film transistor, a source voltage has a greater level than a drain voltage such that a hole may flow from a source to a drain because the hole is a carrier. In the p-type thin film transistor, current flows from the source to the drain because the hole flows from the source to the drain. Conversely, in an n-type thin film transistor, a source voltage has a lower level than a drain voltage such that an electron may flow from a source to a drain because the electron is a carrier. In the n-type thin film transistor, current flows from the drain to the source because the electron flows from the source to the drain. In a thin film transistor, however, a source and a drain may be interchanged in accordance with voltages applied thereto. Taking into consideration such conditions, one of the source and the drain will be referred to as a “first electrode”, and the other of the source and the drain will be referred to as a “second electrode”.

Figure 1:
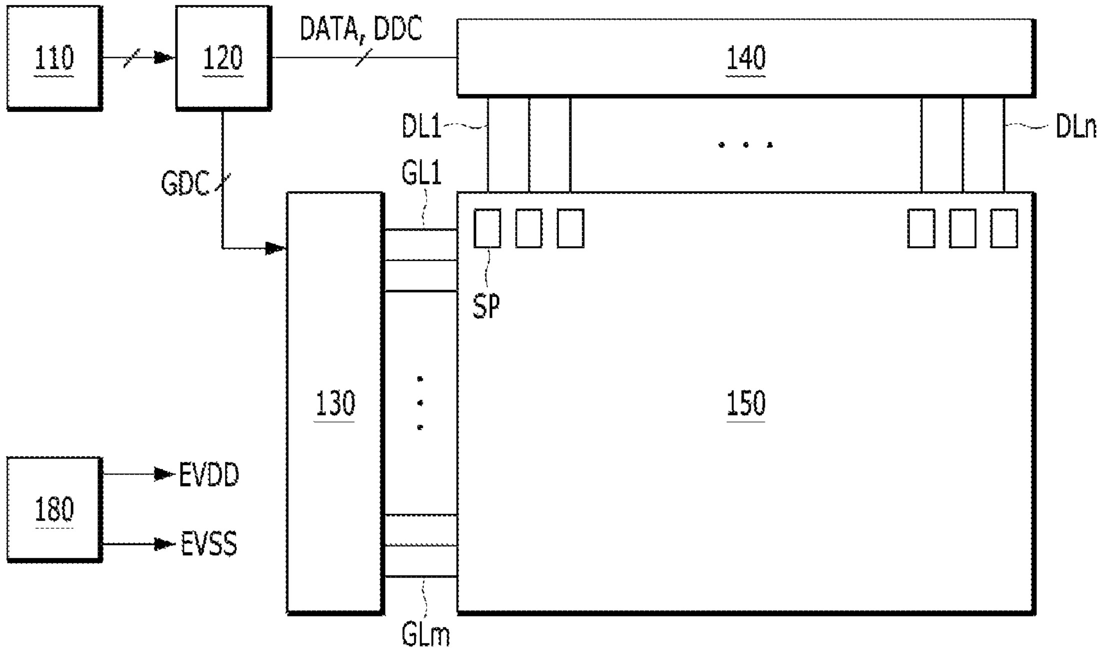
FIG. 1 is a block diagram schematically showing a light emitting display device according to one embodiment.
Figure 2:
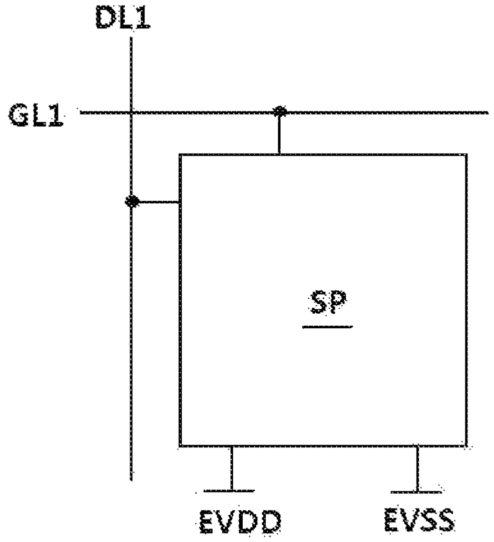
FIG. 2 is a diagram schematically showing a subpixel shown in FIG. 1 according to one embodiment.

FIG. 1 is a block diagram schematically showing a light emitting display device according to one embodiment. FIG. 2 is a diagram schematically showing a subpixel shown in FIG. 1 according to one embodiment.

As shown in FIGS. 1 and 2, the light emitting display device may include an image supplier 110, a timing controller 120, a gate driver 130, a data driver 140, a display panel 150, a power supply 180, etc.

The image supplier 110 (a set or a host system) may output various driving signals together with an image data signal supplied from an exterior of the device or an image data signal stored in an inner memory thereof. The image supplier 110 may supply a data signal and various driving signals to the timing controller 120.

The timing controller 120 may output a gate timing control signal GDC for control of an operation timing of the gate driver 130, a data timing control signal DDC for control of an operation timing of the data driver 140, various synchronization signals (a vertical synchronization signal Vsync and a horizontal synchronization signal Hsync), etc. The timing controller 120 may supply, to the data driver 140, a data signal DATA supplied from the image supplier 110 together with the data timing signal DDC. The timing controller 120 may take the form of an integrated circuit (IC) and, as such, may be mounted on a printed circuit board, without being limited thereto.

The gate driver 130 may output a gate signal (or a scan signal) in response to the gate timing control signal GDC supplied from the timing controller 120. The gate driver 130 may supply a gate signal to the subpixels included in the display panel 150 through gate lines GL1 to GLm. The gate driver 130 may take the form of an integrated circuit (IC) or may be directly formed on the display panel 150 in a gate-in-panel manner, without being limited thereto.

The data driver 140 may sample and latch a data signal DATA in response to the data timing control signal DDC supplied from the timing controller 120, may convert the resultant data signal, which has a digital form, into a data voltage having an analog form, based on a gamma reference voltage, and may output the data voltage. The data driver 140 may supply the data voltage to the subpixels included in the display panel 150 through data lines DL1 to DLn. The data driver 140 may take the form of an IC and, as such, may be mounted on the display panel 150 or may be mounted on a printed circuit board, without being limited thereto.

The power supply 180 may generate a first voltage of a high voltage level and a second voltage of a low voltage level based on an external input voltage supplied from an exterior thereof, and may output the first voltage and the second voltage through a first power line EVDD and a second power line EVSS. The power supply 180 may generate and output not only the first voltage (or first power) and the second voltage (or second power), but also a voltage (for example, a gate voltage including a gate-high voltage and a gate-low voltage) required for driving of the gate driver 130, a voltage (a drain voltage and a drain voltage including a half drain voltage) required for driving of the data driver 140, etc.

The display panel 150 may display an image, corresponding to the driving signal including the gate signal and the data voltage, the first power, the second power, etc. The subpixels of the display panel 150 may directly emit light. The display panel 150 may be fabricated based on a substrate having stiffness or ductility, such as glass, silicon, polyimide or the like. The subpixels, which emit light, may be constituted by red, green and blue subpixels or red, green, blue and white subpixels.

For example, one subpixel SP may include a pixel circuit connected to a first data line DL1, a first gate line GL1, a first power line EVDD and a second power line EVSS while including a switching transistor, a driving transistor, a capacitor, an organic light emitting diode, etc. The subpixel SP, which is used in the light emitting display device, has a complex circuit configuration because the subpixel SP directly emits light. Furthermore, a compensation circuit configured to compensate for degradation of not only the organic light emitting diode, which emits light, but also the driving transistor configured to supply, to the organic light emitting diode, driving current required for driving of the organic light emitting diode, etc. is also diverse. For convenience of illustration, however, the subpixel SP is simply shown in the form of a block.

Meanwhile, in the above description, the timing controller 120, the gate driver 130, the data driver 140, etc. have been described as having individual configurations, respectively. However, one or more of the timing controller 120, the gate driver 130 and the data driver 140 may be integrated into one IC in accordance with an implementation type of the light emitting display device.

Figure 3:
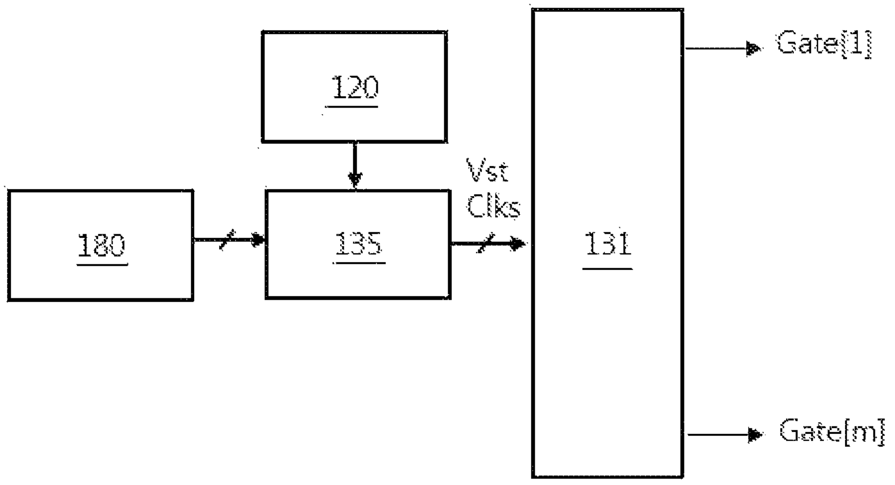
FIGS. 3 and 4 are views explaining a configuration of a gate-in-panel type gate driver according to one embodiment.
Figure 4:
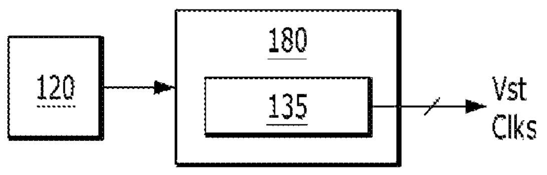
Figure 5A:
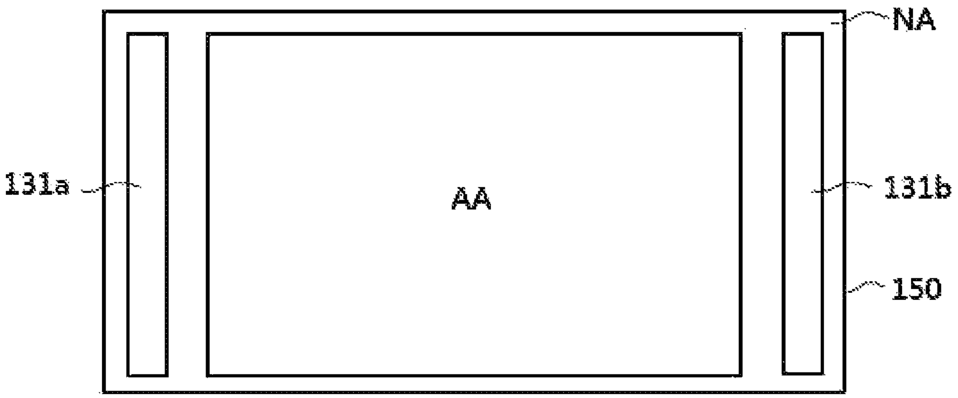
FIGS. 5A and 5B are views showing a disposition example of the gate-in-panel type gate driver according to one embodiment.
Figure 5B:
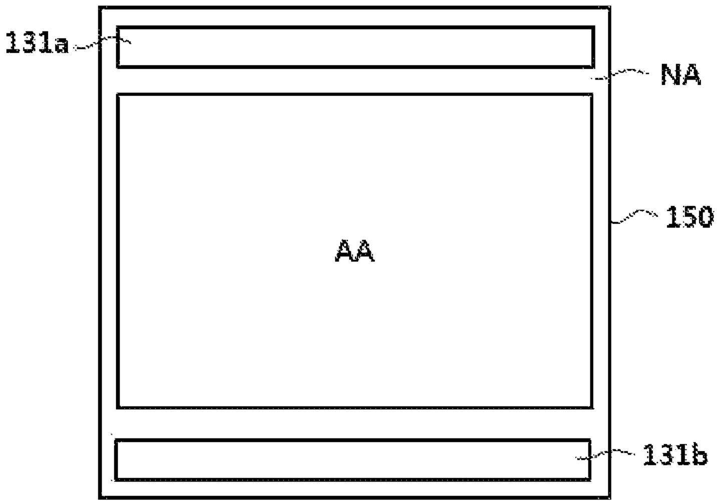

FIGS. 3 and 4 are views explaining a configuration of a gate-in-panel type gate driver according to one embodiment. FIGS. 5A and 5B are views showing a disposition example of the gate-in-panel type gate driver according to one embodiment.

As shown in FIG. 3, the gate-in-panel type gate driver, which is designated by reference numeral "130", may include a shift register 131 and a level shifter 135. The level shifter 135 may generate clock signals Clks and a start signal Vst based on signals and voltages output from a timing controller 120 and a power supply 180. The clock signals Clks may be generated under the condition that the clock signals Clks have K different phases (K being an integer of 2 or greater), such as 2-phase, 4-phase, 8-phase, etc.

The shift register 131 may operate based on the signals Clks and Vst output from the level shifter 135, and may output gate signals Gate to Gate[m] capable of turning on or off transistors formed at a display panel. The shift register 131 may be formed on the display panel in a gate-in-panel manner in the form of a thin film.

As shown in FIGS. 3 and 4, the level shifter 135 may be independently formed in the form of an IC or may be internally included in the power supply 180, differently from the shift register 131. However, this configuration is only illustrative, and the examples of the present disclosure are not limited thereto.

As shown in FIGS. 5A and 5B, in a gate-in-panel type gate driver, shift registers 131*a* and 131*b*, which output gate signals, may be disposed in a non-display area NA of a display panel 150. The shift registers 131*a* and 131*b* may be disposed in left and right non-display areas NA of the display panel 150, as shown in FIG. 5A, or may be disposed in upper and lower non-display areas NA of the display panel 150, as shown in FIG. 5B. Meanwhile, although the shift registers 131*a* and 131*b* have been shown and described in FIGS. 5A and 5B as being disposed in the non-display area NA, the examples of the present disclosure are not limited thereto.

Figure 6:
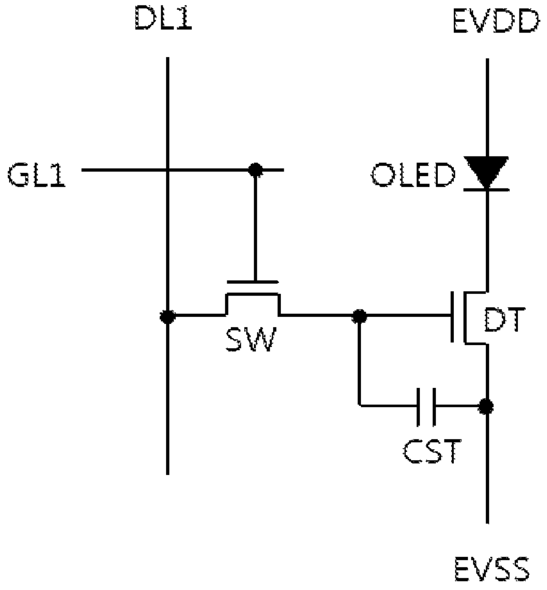
FIG. 6 is a circuit diagram of a circuit configuration of a subpixel according to a first embodiment of the present disclosure.
Figure 7:
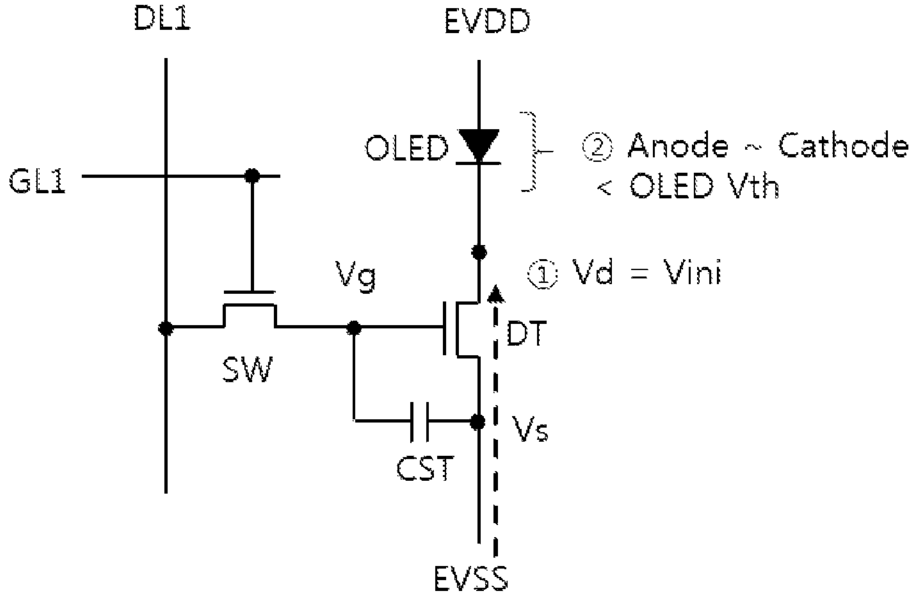
FIGS. 7 and 8 are circuit diagrams explaining a method for initializing a drain node of the subpixel according to the first embodiment of the present disclosure.
Figure 8:
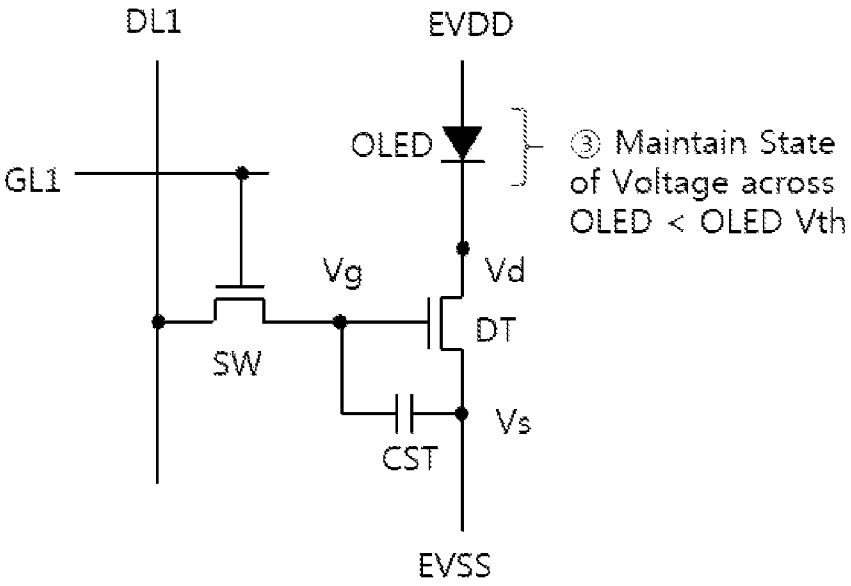

FIG. 6 is a circuit diagram of a circuit configuration of a subpixel according to a first embodiment of the present disclosure. FIGS. 7 and 8 are circuit diagrams explaining a method for initializing a drain node of the subpixel according to the first embodiment of the present disclosure.

As shown in FIG. 6, in accordance with the first embodiment of the present disclosure, the subpixel may include a switching transistor SW, a driving transistor DT, a capacitor CST, and an organic light emitting diode OLED.

The switching transistor SW may be connected, at a gate electrode thereof, to a first gate line GL1 while being connected, at a first electrode thereof, to a first data line DL1 and connected, at a second electrode thereof, to a gate electrode of the driving transistor DT and a first electrode of the capacitor CST. The switching transistor SW may function to transmit, to the first electrode of the capacitor CST, a data voltage applied thereto through the first data line DL1.

The driving transistor DT may be connected, at the gate electrode thereof, to the second electrode of the switching transistor SW and the first electrode of the capacitor CST while being connected, at a first electrode thereof, to a cathode of the organic light emitting diode OLED and connected, at a second electrode thereof, to a second electrode of the capacitor CST and a second power line EVSS. The driving transistor DT may function to generate driving current, corresponding to a data voltage stored in the capacitor CST.

The capacitor CST may be connected, at the first electrode thereof, to the second electrode of the switching transistor SW and the gate electrode of the driving transistor DT while being connected, at the second electrode thereof, to the second electrode of the driving transistor DT and the second power line EVSS. The capacitor CST may function to store a data voltage for driving of the driving transistor DT.

The organic light emitting diode OLED may be connected, at the anode thereof, to the first power line EVDD while being connected, at the cathode thereof, to the first electrode of the driving transistor DT. The organic light emitting diode OLED may function to emit light, corresponding to operation (driving current) of the driving transistor DT.

As shown in FIG. 7, a gate node Vg, a source node Vs and a drain node Vd may be defined with reference to the driving transistor DT. The drain node Vd of the driving transistor DT may be initialized by a particular initialization voltage, expressed as "Vd=Vini". To this end, voltages applied through the gate node Vg, the source node Vs and the drain node Vd may have conditions different from those of general display driving.

When the drain node Vd of the driving transistor DT is initialized, a voltage between the anode and the cathode of the organic light emitting diode OLED may be less (lower in terms of voltage) than a threshold voltage OLED Vth of the organic light emitting diode OLED, expressed as "Anode~Cathode<OLED Vth". Herein, the threshold voltage of the OLED may be a voltage difference between a cathode and an anode of the OLED above which the OLED emits light (and equivalently a voltage difference below which the OLED does not emit light).

As shown in FIG. 8, when the drain node Vd of the driving transistor DT is initialized, the voltage across the organic light emitting diode OLED may be maintained to be less than the threshold voltage OLED Vth of the organic light emitting diode OLED until general display driving is performed.

Figure 9:
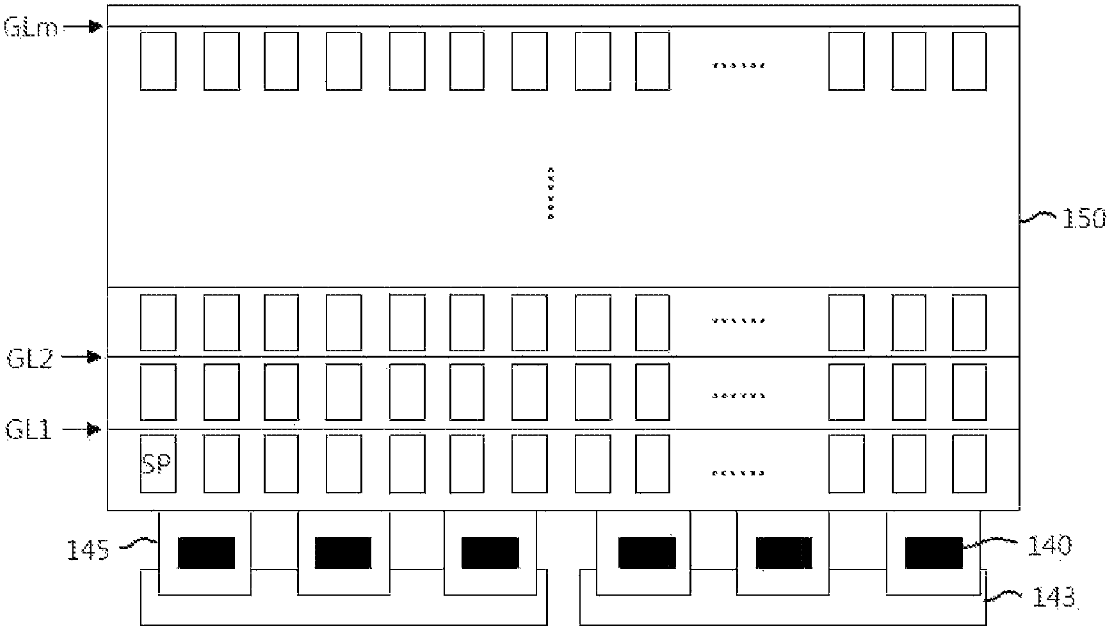
FIGS. 9 and 10 are diagrams explaining a method for initializing subpixels included in the entirety of a display panel of a light emitting display device according to a second embodiment of the present disclosure.
Figure 10:
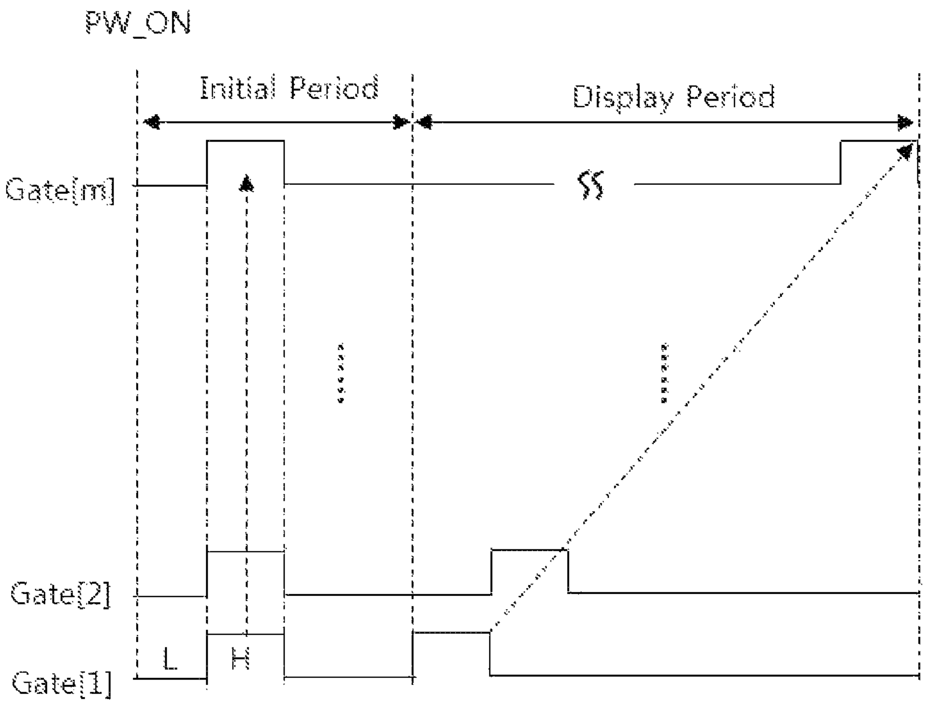

FIGS. 9 and 10 are diagrams explaining a method for initializing subpixels included in the entirety of a display panel of a light emitting display device according to a second embodiment of the present disclosure.

As shown in FIG. 9, the light emitting display device according to the second embodiment of the present disclosure may include a display panel 150, a flexible substrate 145, on which a data driver 140 is mounted, a printed circuit board 143, etc. A first gate line GL1 of the display panel 150 may be disposed in an area in which the data driver 140 is mounted, and an m-th gate line GLm may be disposed in an area opposite to the area in which the data driver 140 is mounted.

As shown in FIGS. 9 and 10, the light emitting display device may include an initialization (initial) period in which subpixels SP included in the entirety of the display panel 140 are initialized, and a display period in which an image is displayed based on the subpixels SP included in the entirety of the display panel 150.

The initialization period may be performed only at least one time when a voltage is applied to the light emitting display device (PW_ON), and the display panel 150 is initially driven. This is because, after the initialization, the display panel 150 is driven in accordance with a predetermined driving method and, as such, a drain node of each subpixel is not maintained at a non-particular voltage.

During the initialization period, an initialization voltage may be simultaneously applied to all subpixels SP included in the display panel 150. For this simultaneous application, a gate signal of a gate-high voltage H may be simultaneously applied to the first to m-th gate lines GL1 to GLm. The gate signal of the gate-high voltage H means a voltage capable of turning on a switching transistor included in each subpixel SP, and a gate signal of a gate-low voltage L means a voltage capable of turning off the switching transistor included in each subpixel SP.

During the display period following the initialization period, the gate signal of the gate-high voltage H may be sequentially applied to the first to m-th gate lines GL1 to GLm.

FIGS. 11 to 16 are circuit diagrams explaining in detail a method for initializing a node of a subpixel in accordance with the second embodiment of the present disclosure.

Figure 11:
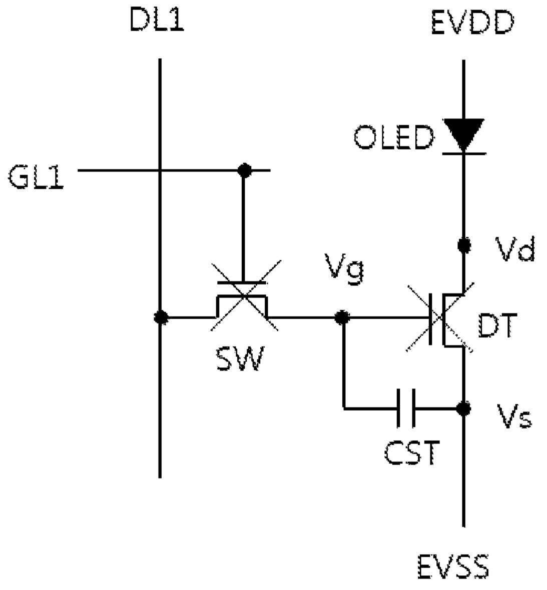
FIGS. 11 to 16 are circuit diagrams explaining in detail a method for initializing a node of a subpixel in accordance with the second embodiment of the present disclosure.

During a first initialization period shown in FIG. 11, a switching transistor SW and a driving transistor DT may have a turned-off state. In this state, a first data line DL1 and a first gate line GL1 are in a state in which no signal or voltage is applied thereto, and it may also be no matter whether or not a first voltage of a high voltage level and a second voltage of a low voltage level for driving of the subpixel are applied to a first power line EVDD and a second power line EVSS.

Figure 12:
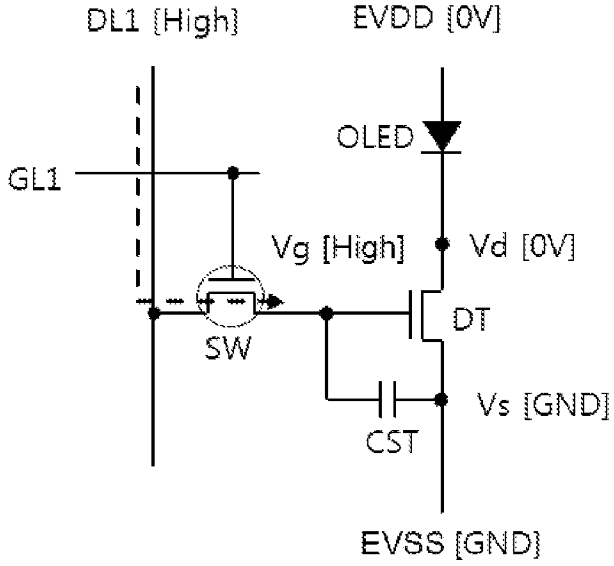

During a second initialization period shown in FIG. 12, the switching transistor SW may have a turned-on state. In this state, the first gate line GL1 may be in a state in which a gate signal of a gate-high voltage is applied thereto, and the first data line DL1 may be in a state in which a high data voltage High is applied thereto. In addition, the first power line EVDD may be in a state in which a voltage of 0V is applied thereto, and the second power line EVSS may be in a state in which a ground voltage GND is applied thereto. Accordingly, the high data voltage High may be applied to a gate node Vg, the ground voltage GND may be applied to a source node Vs, and the voltage of 0V may be applied to a drain node Vd.

Meanwhile, although voltage application to the first power line EVDD has been described in conjunction with an example in which the voltage of 0V is applied to the first power line EVDD, any voltage may be applied to the first power line EVDD, so long as the voltage has a lower voltage level than a threshold voltage OLED Vth of an organic light emitting diode OLED. In addition, the high data voltage High may have any voltage level, so long as the voltage level can turn on the driving transistor DT.

Figure 13:
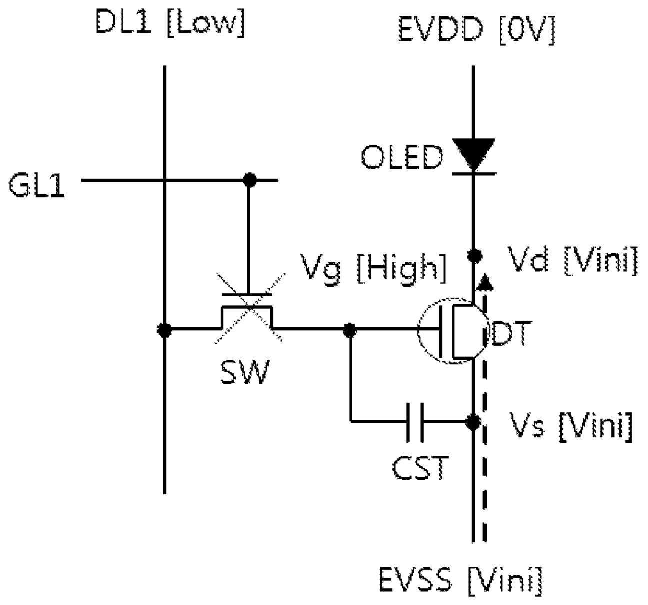

During a third initialization period shown in FIG. 13, the switching transistor SW may have a turned-off state, and the driving transistor DT may have a turned-on state by the high data voltage High. In this state, the first gate line GL1 may be in a state in which a gate signal of a gate-low voltage is applied thereto, and the first data line DL1 may be in a state in which a low data voltage Low is applied thereto. In addition, the first power line EVDD may be in a state in which application of the voltage of 0V thereto is maintained, and the second power line EVSS may be in a state in which voltage application thereof is switched from the ground voltage GND to an initialization voltage Vini. Accordingly, the high data voltage High may be applied to the gate node Vg, and the initialization voltage Vini may be applied to both the source node Vs and the drain node Vd.

The initialization voltage Vini may have a greater voltage level than a voltage obtained by subtracting (deducting) the threshold voltage OLED Vth of the organic light emitting diode OLED from the first voltage of the high voltage level. In addition, the initialization voltage Vini may have a lower voltage level than a voltage obtained by adding (summing) the first voltage of the high voltage level and a breakdown voltage of the organic light emitting diode OLED (magnitude of OLED breakdown voltage=about 50V). That is, the initialization voltage Vini may have any voltage level, so long as the voltage level can initialize the drain node Vd while preventing the organic light emitting diode OLED from emitting light.

Figure 14:
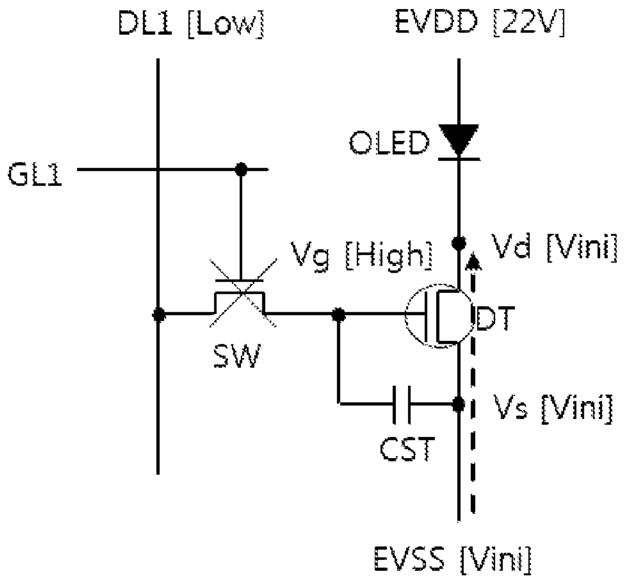

During a fourth initialization period shown in FIG. 14, the switching transistor SW may have a turned-off state, and the driving transistor DT may have a turned-on state by the high data voltage High. In this state, the first gate line GL1 may be in a state in which the gate signal of the gate-low voltage is applied thereto, and the first data line DL1 may be in a state in which the low data voltage Low is applied thereto. In addition, the first power line EVDD may be in a state in which voltage application thereof is switched from the voltage of 0V to the first voltage of the high voltage level (e.g., 22V), and the second power line EVSS may be in a state in which application of the initialization voltage Vini thereto is maintained. Accordingly, the high data voltage High may be applied to the gate node Vg, and the initialization voltage Vini may be applied to both the source node Vs and the drain node Vd.

Figure 15:
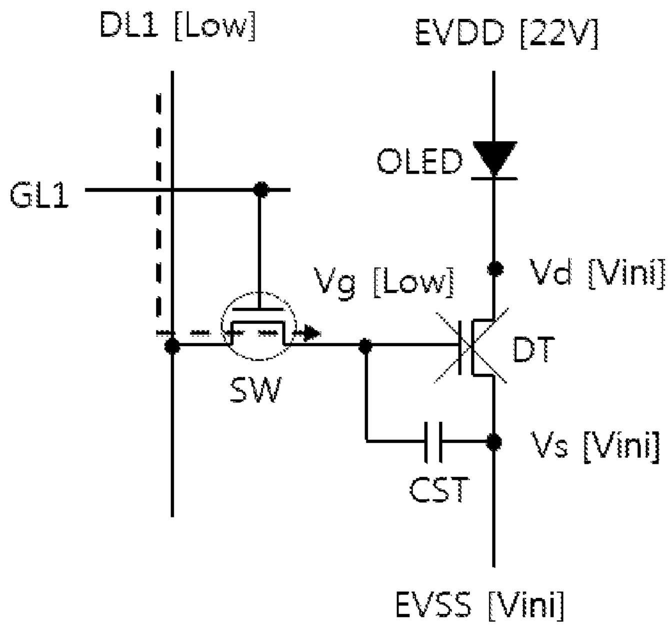

During a fifth initialization period shown in FIG. 15, the switching transistor SW may have a turned-on state, and the driving transistor DT may be in a turned-off state by the low data voltage Low. In this state, the first gate line GL1 may be in a state in which the gate signal of the gate-high voltage is applied thereto, and the first data line DL1 may be in a state in which the low data voltage Low is applied thereto. In addition, the first power line EVDD may be in a state in which application of the first voltage of the high voltage level (e.g., 22V) thereto is maintained, and the second power line EVSS may be in a state in which application of the initialization voltage Vini thereto is maintained. Accordingly, the low data voltage Low may be applied to the gate node Vg, and the initialization voltage Vini may be applied to both the source node Vs and the drain node Vd. The low data voltage Low may have any voltage level, so long as the voltage level can turn off the driving transistor DT.

Figure 16:
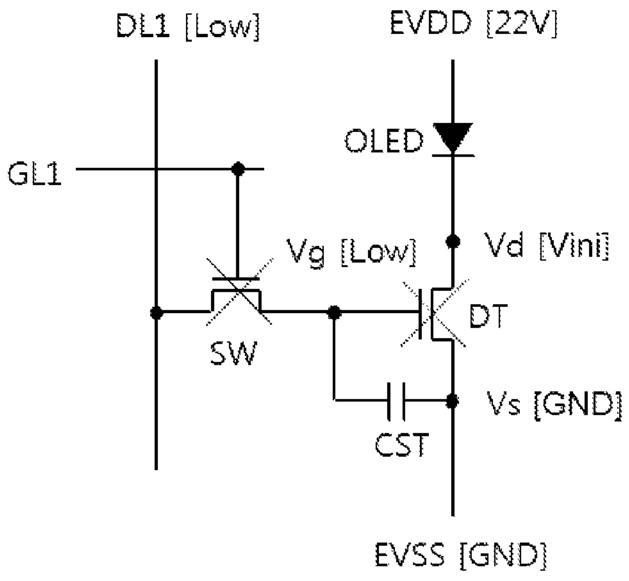

During a sixth initialization period shown in FIG. 16, both the switching transistor SW and the driving transistor DT may have a turned-off state. In this state, the first gate line GL1 may be in a state in which the gate signal of the gate-low voltage is applied thereto, and the first data line DL1 may be in a state in which the low data voltage Low is applied thereto. In addition, the first power line EVDD may be in a state in which application of the first voltage of the high voltage level (e.g., 22V) thereto is maintained, and the second power line EVSS may be in a state in which voltage application thereof is switched from the initialization voltage Vini to the ground voltage GND. Accordingly, the low data voltage Low may be applied to the gate node Vg, the ground voltage GND may be applied to the source node Vs, and the drain node Vd may be in a state in which application of the initialization voltage Vini thereto is maintained.

Figure 17:
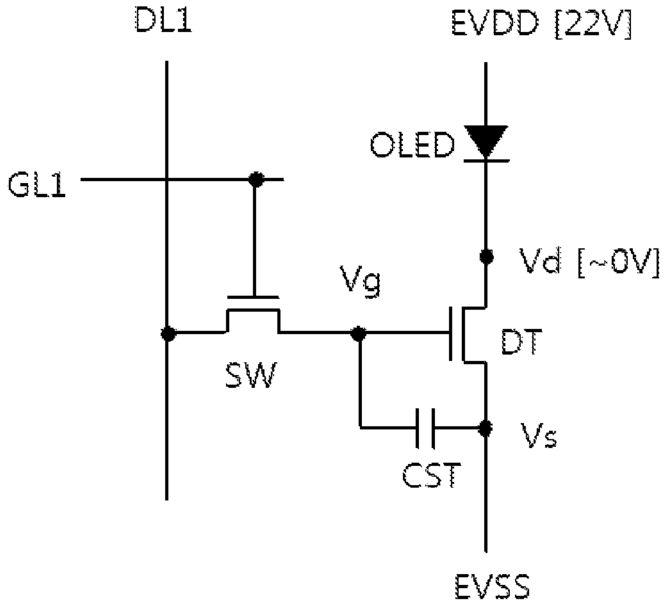
FIGS. 17, 18A, and 18B are diagrams explaining advantages of the embodiments of the present disclosure, compared with a comparative example.
Figure 18A:
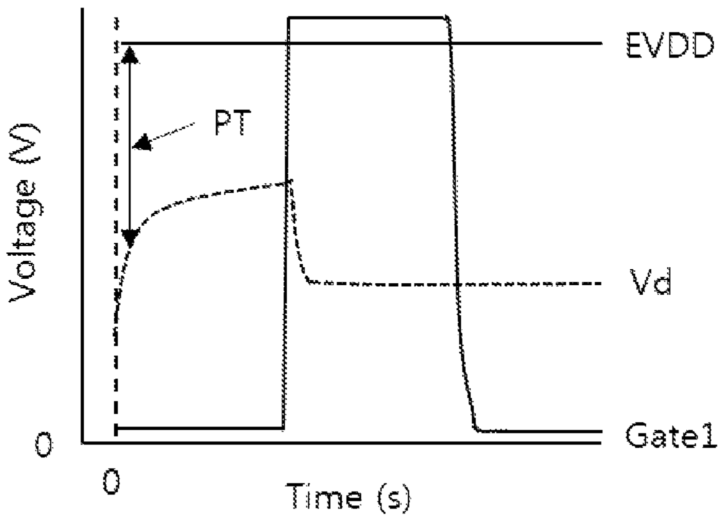
Figure 18B:
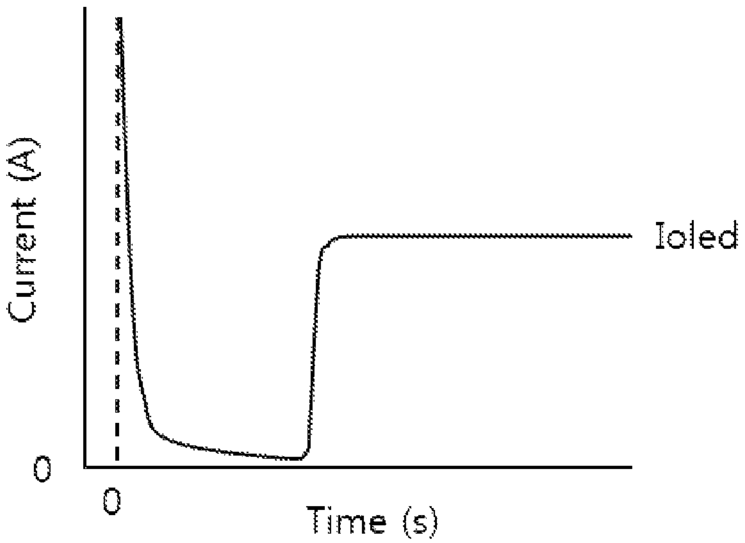

FIGS. 17, 18A, and 18B are diagrams explaining advantages of the embodiments of the present disclosure compared with a comparative example.

In FIGS. 18A and 18B, "EVDD" designates a first voltage of a high voltage level, "Vd" designates a voltage at a drain node Vd of a subpixel, "Gate1" designates a gate signal, and "Ioled" designates current flowing through an organic light emitting diode OLED.

The comparative example of FIG. 17 is in a state in which an initialization voltage is not applied to the drain node Vd of the subpixel upon initial driving, differently from the examples as described above. In the subpixel of the comparative example shown in FIG. 17, when a first voltage of a high voltage level (e.g., 22V) is applied for initial driving, a great potential difference may be generated across the organic light emitting diode OLED, irrespective of turning-on/off of a driving transistor DT. This can be seen, referring to "PT" in FIG. 18A. When a great potential difference is generated across the organic light emitting diode OLED, as shown by "PT" in FIG. 18A, instantaneous current generation may occur, as shown in FIG. 18B. In this case, the organic light emitting diode OLED may generate flickering caused by current leakage. Furthermore, breakdown of or damage to the organic light emitting diode OLED may occur due to the great potential difference.

However, when initialization of the subpixel is performed by applying a voltage of a voltage level (for example, Vini>EVDD−OLED Vth) capable of initializing the drain node Vd of the subpixel while preventing the organic light emitting diode OLED from emitting light, as in the examples of the present disclosure, it may be possible to eliminate problems occurring in the comparative example.

As apparent from the above description, in accordance with the exemplary examples of the present disclosure, there is an effect in that it may be possible to eliminate a problem in which an organic light emitting diode flickers or is damaged due to a high voltage difference during initial driving, through application of a voltage having a voltage level capable of initializing a drain node of a subpixel while preventing the organic light emitting diode from emitting light.

The foregoing description and the accompanying drawings have been presented in order to illustratively explain technical ideas of the present disclosure. A person skilled in the art to which the present disclosure pertains can appreciate that diverse modifications and variations acquired by combining, dividing, substituting, or changing constituent elements may be possible without changing essential characteristics of the present disclosure, provided that they remain within the scope of the appended claims. Therefore, the foregoing examples disclosed herein shall be interpreted as illustrative only and not as limitative of the principle and scope of the present disclosure, which is defined by the appended claims. It should be understood that the scope of the present invention shall be defined by the appended claims.

What is claimed is:

1. A light emitting display device comprising:

an organic light emitting diode having an anode electrode connected to a first power line and a cathode electrode;

a capacitor configured to store a data voltage, the capacitor including a first electrode and a second electrode; and a driving transistor having a first electrode connected to the cathode electrode of the organic light emitting diode, a gate electrode connected to the first electrode of the capacitor, and a second electrode connected to the second electrode of the capacitor and a second power line, wherein the driving transistor is configured to apply an initialization voltage to a node, wherein the node is connected to the cathode electrode of the organic light emitting diode and the first electrode of the driving transistor.

2. The light emitting display device according to claim 1, wherein the initialization voltage prevents the organic light emitting diode from emitting light.

3. The light emitting display device according to claim 2, wherein the initialization voltage is such that a voltage difference between the anode electrode and the cathode electrode of the organic light emitting diode is less than a threshold voltage of the organic light emitting diode.

4. The light emitting display device according to claim 1, wherein the initialization voltage is greater than a voltage obtained by subtracting a threshold voltage of the organic light emitting diode from a voltage level applied to the first power line.

5. The light emitting display device according to claim 4, wherein the initialization voltage is less than a voltage obtained by adding the voltage level applied to the first power line and a breakdown voltage of the organic light emitting diode.

6. A light emitting display device comprising:

a display panel comprising a subpixel comprising an organic light emitting diode having an anode connected to a first power line, a capacitor configured to store a data voltage, and a driving transistor having a first electrode connected to a cathode electrode of the organic light emitting diode, a gate electrode connected to the first electrode of the capacitor, and a second electrode connected to a second electrode of the capacitor and a second power line; and a driver configured to drive the display panel, wherein the display panel is configured to have an initialization period in which an initialization voltage is applied to a node connected to the cathode electrode of the organic light emitting diode and the first electrode of the driving transistor.

7. The light emitting display device according to claim 6, configured such that the initialization period is performed at least one time during initial driving of the display panel.

8. The light emitting display device according to claim 6, wherein the initialization voltage is transmitted through the second power line and is applied to the node, at which the cathode electrode of the organic light emitting diode and the first electrode of the driving transistor are interconnected, via the second electrode of the driving transistor.

9. A driving method of a light emitting display device comprising a display panel including a subpixel comprising an organic light emitting diode having an anode electrode connected to a first power line and a cathode electrode, a capacitor configured to store a data voltage and including a first electrode and a second electrode, and a driving transistor having a first electrode connected to the cathode electrode of the organic light emitting diode, a gate electrode connected to the first electrode of the capacitor, and a second electrode connected to the second electrode of the capacitor and a second power line, and a driver configured to drive the display panel, the driving method comprising:

applying an initialization voltage to the second power line; and turning on the driving transistor such that the initialization voltage is applied to a node at which the cathode electrode of the organic light emitting diode and the first electrode of the driving transistor are interconnected via the second electrode of the driving transistor.

10. The driving method according to claim 9, wherein the driving transistor is turned on after the initialization voltage is applied to the second power line.

11. The driving method according to claim 10, wherein a voltage of the first power line is increased to a high voltage level after the initialization voltage is applied to the node, the high voltage level corresponding to a threshold voltage of the organic light emitting diode.

12. The driving method according to claim 11, further comprising:

subsequent to increasing the voltage of the first power line to the high voltage level, turning the driving transistor off and holding the second power line at a ground voltage.

13. The driving method according to claim 9, wherein the initialization voltage is such that a voltage difference between the anode electrode and the cathode electrode of the organic light emitting diode is less than a threshold voltage of the organic light emitting diode.

14. The driving method according to claim 9, wherein the initialization voltage is greater than a voltage obtained by subtracting a threshold voltage of the organic light emitting diode from a voltage level applied to the first power line, and the initialization voltage is less than a voltage obtained by adding the voltage level applied to the first power line and a breakdown voltage of the organic light emitting diode.

15. The driving method according to claim 9, wherein the initialization voltage is supplied to the second power line during an initialization period which precedes a display period, wherein the display period is a period in which an image is displayed by the display panel.

* * * * *